United States Patent
Aoki et al.

(10) Patent No.: US 8,220,515 B2
(45) Date of Patent: Jul. 17, 2012

(54) TIRE-RIM ASSEMBLY AND SPONGE MEMBER USED IN THE SAME

(75) Inventors: Masami Aoki, Yokohama (JP); Kazuto Fujita, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 343 days.

(21) Appl. No.: 12/513,951

(22) PCT Filed: Nov. 7, 2007

(86) PCT No.: PCT/JP2007/071659
§ 371 (c)(1),
(2), (4) Date: May 20, 2009

(87) PCT Pub. No.: WO2008/062673
PCT Pub. Date: May 29, 2008

(65) Prior Publication Data
US 2010/0038005 A1    Feb. 18, 2010

(30) Foreign Application Priority Data
Nov. 21, 2006 (JP) .................. 2006-314320

(51) Int. Cl.
*B60C 5/00* (2006.01)
*B60C 19/00* (2006.01)
(52) U.S. Cl. ........................ 156/450; 152/155
(58) Field of Classification Search .......... 152/155–166, 152/154.1, 450
See application file for complete search history.

(56) References Cited

U.S. PATENT DOCUMENTS

| | | | | |
|---|---|---|---|---|
| H1870 H | * | 10/2000 | Mizata et al. .................. | 152/310 |
| 6,729,373 B2 | * | 5/2004 | Yukawa et al. ................ | 152/450 |
| 2001/0042580 A1 | * | 11/2001 | Teratani ......................... | 152/450 |
| 2002/0124921 A1 | | 9/2002 | Nakajima et al. | |
| 2005/0205183 A1 | * | 9/2005 | Yukawa .......................... | 152/450 |
| 2007/0175559 A1 | * | 8/2007 | Tanno et al. ................... | 152/450 |

FOREIGN PATENT DOCUMENTS

| | | |
|---|---|---|
| JP | 62-050203 A | 3/1987 |
| JP | 62-216803 A | 9/1987 |
| JP | 01-115701 A | 5/1989 |
| JP | 2002-195907 A | 7/2002 |
| JP | 3622957 B2 | 2/2005 |
| JP | 2005-104314 A | 4/2005 |
| JP | 2006143022 A | 6/2006 |
| WO | 2005/087515 A1 | 9/2005 |
| WO | 2006088195 A1 | 8/2006 |

OTHER PUBLICATIONS

Supplementary European Search Report issued in European Patent Application No. 07831390.5-2425/2093079, 7 pages, dated Jul. 14, 2010. United States Statutory Invention Registration No. H,1870.
Japanese Office Action issued in Application No. 2008-545359 dated Apr. 3, 2012.
Chinese Office Action issued in Application No. 200780043032.8 dated Apr. 6, 2012.

* cited by examiner

*Primary Examiner* — Katarzyna Wyrozebski Lee
*Assistant Examiner* — Scott W Dodds
(74) *Attorney, Agent, or Firm* — Sughrue Mion, PLLC

(57) ABSTRACT

This invention relates to a tire-rim assembly which is easily produced at low cost, excellent in durability and capable of notably reducing road noise, and more particularly to a tire-rim assembly comprising a pneumatic tire (1), a rim (2) and a sponge member (4) disposed in a tire internal cavity (3) defined by the pneumatic tire (1) and the rim (2), characterized in that the sponge member (4) has a specific gravity of higher than 0.06 but not higher than 0.25 and/or an air permeability of not higher than 5 cc/cm$^2$/sec.

10 Claims, 2 Drawing Sheets

TIRE-RIM ASSEMBLY AND SPONGE MEMBER USED IN THE SAME

TECHNICAL FIELD

This invention relates to a tire-rim assembly and a sponge member used in the same, and more particularly to a tire-rim assembly which is easily produced at low cost and is capable of notably reducing road noise.

BACKGROUND ART

A pneumatic tire assembled onto a rim commonly causes a cavity resonance phenomenon due to an internal shape of the tire while a vehicle runs, and thereby noise, so-called "road noise", is caused in an interior of the vehicle during the running. The cavity resonance has a frequency within a range of 180 to 300 Hz and forms a sharp peak when it is transmitted to an axle, differently from other bands, and thereby contributes to the noise in the interior of the vehicle.

To this problem, JP-A-H01-115701 discloses a technique for suppressing the cavity resonance phenomenon by using a wheel rim having the specified structure. However, the wheel rim disclosed in JP-A-H01-115701 has a sophisticated structure comprising a cavity portion communicating with a tire internal cavity, and therefore it is difficult to produce the wheel rim and cost of the tire-rim assembly must become high.

On the other hand, JP-B-3622957 discloses a tire-rim assembly wherein a strip-shaped sheet not having a ring shape is fixed in a tire internal cavity defined by the tire and the rim and the strip-shaped sheet has a specific gravity within a specified range, as a tire-rim assembly capable of reducing the road noise during the running without deteriorating rim assemblability.

DISCLOSURE OF THE INVENTION

However, the inventors have studied and found that the tire-rim assembly disclosed in JP-B-3622957 can reduce the road noise during the running as compared with a common tire-rim assembly, but still has room for improvement in reducing the road noise.

It is, therefore, an object of the invention to solve the above-mentioned problems of the conventional techniques and to provide a tire-rim assembly which is easily produced at low cost and is capable of notably reducing road noise, and a sponge member used in the same.

The inventors have made various studies in order to achieve the above objects and discovered that sound insulating property and sound absorbing property of a tire-rim assembly can be highly improved to significantly reduce road noise by disposing a sponge member having a specific gravity of higher than 0.06 but not higher than 0.25 and/or an air permeability of not higher than 5 $cc/cm^2/sec$ in at least a part of a tire internal cavity defined by the tire and the rim, and as a result the invention has been accomplished.

That is, the tire-rim assembly according to the invention comprises a pneumatic tire, a rim and a sponge member disposed in a tire internal cavity defined by the pneumatic tire and the rim, and is characterized in that the sponge member has a specific gravity of higher than 0.06 but not higher than 0.25.

Also, another tire-rim assembly according to the invention comprises a pneumatic tire, a rim and a sponge member disposed in a tire internal cavity defined by the pneumatic tire and the rim, and is characterized in that the sponge member has an air permeability of not higher than 5 $cc/cm^2/sec$.

In the tire-rim assembly according to the invention, it is preferable that the sponge member has a specific gravity of higher than 0.06 but not higher than 0.25 and an air permeability of not higher than 5 $cc/cm^2/sec$.

In a preferable embodiment of the tire-rim assembly according to the invention, the sponge member is a molded body using a synthetic resin foam.

In another preferable embodiment of the tire-rim assembly according to the invention, the sponge member is a thermally compression-molded body formed by thermally compressing the synthetic resin foam. In this case, the gravity and the air permeability can be controlled by the thermal compression, and one having any shape can be formed.

In another preferable embodiment of the tire-rim assembly according to the invention, the sponge member is an ether-based polyurethane foam. In this case, there is an advantage in which the sponge member is hardly hydrolyzed.

In another preferable embodiment of the tire-rim assembly according to the invention, the sponge member is a synthetic rubber foam. In this case, heat resistance and weather resistance such as water resistance of the sponge member are improved.

In another preferable embodiment of the tire-rim assembly according to the invention, the sponge member does not contain a water repellent agent. In this case, cost of the sponge member can be reduced.

In the tire-rim assembly according to the invention, it is preferable that the sponge member is disposed on at least a part of an inner surface of a tread portion of the pneumatic tire and the rim.

According to the invention, there can be provided a tire-rim assembly being excellent in sound insulating property and sound absorbing property as well as durability, and capable of significantly reducing road noise, wherein a sponge member having a specific gravity of higher than 0.06 but not higher than 0.25 and/or an air permeability of not higher than 5 $cc/cm^2/sec$ is disposed in a tire internal cavity defined by the tire and the rim. Moreover, there can be provided a sponge member which can be preferably used in such an assembly.

BEST MODE FOR CARRYING OUT THE INVENTION

Figure 1:
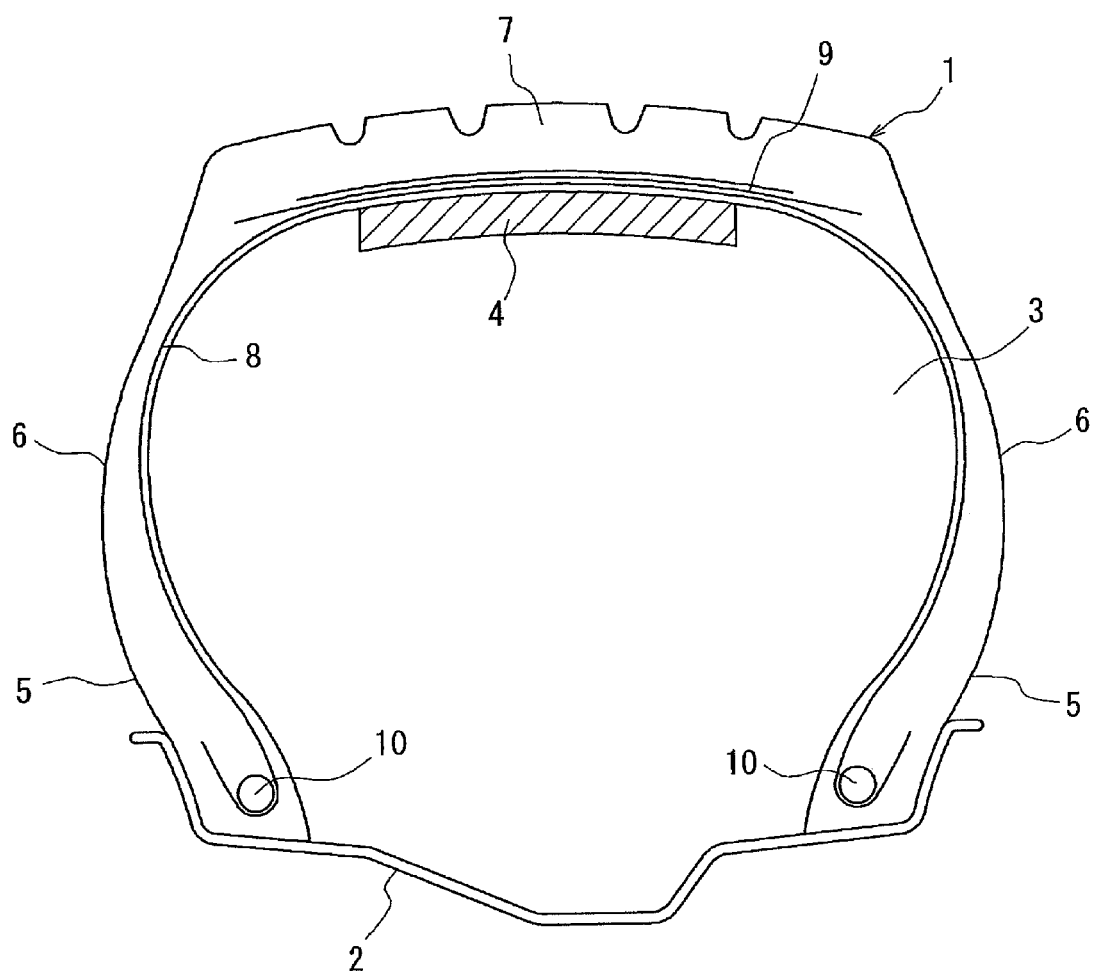
FIG. 1 is a sectional view of an example of the tire-rim assembly according to the invention.

The tire-rim assembly according to the invention will be described in detail with reference to the accompanying drawings below. FIG. 1 is a sectional view of an example of the tire-rim assembly according to the invention. The assembly shown in FIG. 1 comprises a pneumatic tire 1, a rim 2 fitted to the pneumatic tire 1 and a sponge member 4 disposed in at least a part of a tire internal cavity 3 defined by the pneumatic tire 1 and the rim 2.

The pneumatic tire 1 of the assembly shown in FIG. 1 comprises a pair of bead portions 5, a pair of sidewall portions 6, a tread portion 7 continuing to both of the sidewall portions 6, a carcass 8 toroidally extending between the pair of bead portions 5 and reinforcing these portions 5, 6, 7 and a belt 9 disposed on an outside of a crown portion of the carcass 8 in a radial direction of the tire. The illustrated carcass 8 is composed of one carcass ply and consists of a main body portion toroidally extending between a pair of bead cores 10 embedded in the respective bead portions 5 and a turnup portion wound around each bead core 10 from an inside to an outside in a widthwise direction of the tire, but the ply number and the structure of the carcass of the pneumatic tire are not particularly limited in the assembly according to the invention. Further, the illustrated belt 9 is composed of two belt layers, but the number of belt layers constituting the belt of the pneumatic tire is not particularly limited in the assembly according to the invention. Furthermore, the pneumatic tire of the assembly according to the invention may further comprise a known tire member such as a belt reinforcing layer, a rim guard or the like, if necessary.

On the other hand, the rim 2 of the assembly according to the invention is determined by a specification depending on the pneumatic tire 1. As the specification are mentioned JATMA YEAR BOOK (2000), ETRTO STANDARD MANUAL 2000, TRA (THE TIRE and RIM ASSOCIATION INC.) 2000 YEAR BOOK and so on. When the specification is typified by JATMA YEAR BOOK, it is an applicable rim described in a general information.

The sponge member 4 of the assembly according to the invention is required to be disposed in at least a part of the tire internal cavity 3 defined by the above-mentioned pneumatic tire 1 and rim 2, and may be fixed on either or both of the inner surface of the pneumatic tire 1 and the tire internal cavity 3 side surface of the rim 2, or may not be fixed. Further, when the sponge member 4 is fixed on the inner surface of the pneumatic tire 1 and/or the tire internal cavity 3 side surface of the rim 2, the sponge member 4 may or may not continuously extend in a circumferential direction of the tire, but is preferable to continuously extend in a circumferential direction of the tire from a viewpoint of a uniformity of the tire. In this context, the sound insulating property and the sound absorbing property of the assembly can be improved by fixing the sponge member 4 on the inner surface of the pneumatic tire 1, and the sound insulating property and the sound absorbing property of the assembly can be further improved by fixing the sponge member 4 on the tire internal cavity 3 side surface of the rim 2. Also, the sound absorbing property of the assembly can be improved even if the sponge member 4 is not fixed on the inner surface of the pneumatic tire or the outer surface of the rim 2.

The sponge member 4 of the assembly according to the invention is preferably disposed on at least a part of the inner surface of the tread portion 7 of the pneumatic tire 1 as shown in FIG. 1 from a viewpoint of the sound insulating property. When the sponge member 4 is disposed on at least a part of the inner surface of the tread portion 7 of the pneumatic tire 1, the road noise transmitted from a road surface can be insulated to effectively suppress cavity resonance of the assembly, and as a result, the road noise can be notably reduced. Also, the sponge member 4 is preferably disposed on the rim 2 from a viewpoint of the sound insulating property and the sound absorbing property.

The sponge member 4 of the assembly according to the invention is characterized by having a specific gravity of higher than 0.06 but not higher than 0.25 and/or an air permeability of not higher than 5 $cc/cm^2/sec$. The sponge member 4 having a specific gravity of higher than 0.06 but not higher than 0.25 includes small-sized cells constituting the sponge member, has a large surface area with respect to an apparent volume and is excellent in the sound insulating property and the sound absorbing property, and further has a thick framework resin portion constituting the cells and has a high mechanical physicality, and therefore is hardly damaged even during the high speed running when it is disposed in the tire internal cavity 3, and furthermore has an improved heat resistance. When the specific gravity of the sponge member 4 is not higher than 0.06, the size of the cell is large, the surface area is small, the framework resin portion is thin, it is difficult to ensure a low air permeability, the sound insulating property, the sound absorbing property and the durability are deteriorated, and there is a disadvantage in acoustic radiation efficiency. Further, from these viewpoints, the sponge member 4 preferably has a specific gravity of not lower than 0.065. While when the specific gravity of the sponge member 4 exceeds 0.25, the sponge member becomes heavy, there is a problem in manufacturing that it is difficult to stably control to make the cells communicate with each other and to lower the air permeability of the sponge member, and further there is a disadvantage in production cost.

Further, when the air permeability of the sponge member 4 is reduced as low as possible from a viewpoint of manufacturing to be not higher than 5 $cc/cm^2/sec$, the sound insulating property is excellent, a peak of a sound absorption coefficient of the sponge member 4 comes close to a frequency band of the cavity resonance and thereby the sound absorbing effect within the frequency band of the cavity resonance can be improved. Moreover, the air permeability of the sponge member 4 is more preferable to be not higher than 1 $cc/cm^2/sec$. In this context, the air permeability of the sponge member 4 can be measured according to a method B in JIS K 6400-7 (Flexible cellular polymeric materials—Determination of physical properties—Part 7: Air permeability).

The sponge member is a porous structural body, and its cell (pore) may be a continuous cell or a closed cell, but is preferable to be the continuous cell. When the cell of the sponge member is the continuous cell, the sound insulating property and the sound absorbing property are improved, while when the cell of the sponge member is the closed cell, the sound insulating property is improved. In this context, the cell of the sponge member is commonly in the form of an approximately regular dodecahedron. When a membrane constituting each surface of the regular dodecahedron vibrates, energy of sound (road noise) becomes heat energy and thereby is reduced, and as a result, the road noise is reduced.

As the porous structural body are mentioned a foamed rubber or resin, a nonwoven fabric of synthetic fiber, plant fiber or animal fiber, and so on. As a material of the foam are mentioned synthetic rubbers such as ethylene-propylene-diene rubber (EPDM), silicone rubber, acrylonitrile-butadiene rubber (NBR), styrene-butadiene rubber (SBR), butyl rubber, chloroprene rubber, acrylic rubber, epichlorohydrin rubber (ECO) and the like, natural rubber, and resins such as polyurethane, polystyrene, polyethylene, polypropylene, ethylene-vinyl acetate copolymer (EVA) and the like. Among them, the polyurethane is preferable.

Moreover, the sponge member may contain various additives in addition to the above-mentioned rubber or resin, but is preferable to not contain a water repellent agent. When the sponge member does not contain the water repellent agent, the sponge member can be easily produced and cost can be saved.

When the polyurethane foam is used as the sponge member, the polyurethane foam may be produced by a common process such as a one-shot process, a prepolymer process or the like with using polyurethane raw materials such as a polyol, a polyisocyanate and so on. Further, the polyurethane foam may be one foamed by using a foaming agent or one formed by foaming the polyurethane raw material with mechanical stirring (mechanical froth method).

The polyol used as the polyurethane raw material is a compound having plural hydroxyl groups. As the polyol are concretely mentioned polyether polyol, polyester polyol, polytetramethylene glycol, polybutadiene polyol, alkylene oxide-modified polybutadiene polyol, polyisoprene polyol and so on. For example, the polyether polyol can be obtained by adding an alkylene oxide such as ethylene oxide, propylene oxide or the like to a polyalcohol such as ethylene glycol, propylene glycol, glycerin or the like. Also, the polyester polyol can be obtained, for example, from a polyalcohol such as ethylene glycol, diethylene glycol, 1,4-butanediol, 1,6-hexanediol, propylene glycol, trimethylolethane, trimethylolpropane or the like and a polybasic carboxylic acid such as adipic acid, glutaric acid, succinic acid, sebacic acid, pimelic acid, suberic acid or the like. These polyols may be used alone or in a combination of two or more. The polyether polyol is preferable in view of resistance to humidity and heat, and durability.

The polyisocyanate which may be used as the polyurethane raw material is a compound having plural isocyanate groups. As the polyisocyanate are concretely mentioned tolylene diisocyanate (TDI), diphenylmethane diisocyanate (MDI), crude diphenylmethane diisocyanate (crude MDI), isophorone diisocyanate (IPDI), hydrogenated diphenylmethane diisocyanate, hydrogenated tolylene diisocyanate and hexamethylene diisocyanate (HDI), as well as their isocyanurate-modified compounds, carbodiimide-modified compounds, glycol-modified compounds and so on. These polyisocyanates may be used alone or in a combination of two or more.

The amount of the polyisocyanate used is preferable to be selected so that the isocyanate index is within a range of 80 to 130, and is more preferable to be selected so that the isocyanate index is within a range of 100 to 110.

The polyurethane raw material may further contain a catalyst, a foam stabilizer, a foaming agent and so on in addition to the polyol and the polyisocyanate.

As the catalyst are mentioned amine-based compounds such as triethylenediamine, N-methyl morpholine, tetramethyl-1,4-butanediamine, N-methyl piperazine, dimethylethanolamine, diethylethanolamine, triethylamine and the like; organotin compounds such as stannous octenoate, dibutyltin dilaurate, dibutyltin di-2-ethylhexoate and the like. These catalysts may be used alone or in a combination of two or more. The amount of the catalyst used is preferable to be within a range of 0.005 to 2.0 parts by mass based on 100 parts by mass of the polyol.

As the foam stabilizer are mentioned organic silicon-based surfactants such as organosiloxane-polyoxyalkylene copolymer, polyalkenylsiloxane having a polyoxyalkylene side chain and so on. These foam stabilizers may be used alone or in a combination of two or more. The amount of the foam stabilizer used is preferable to be within a range of 0.1 to 3.0 parts by mass based on 100 parts by mass of the polyol.

As the foaming agent are mentioned water and volatile liquids having a low boiling point such as trichloromonofluoromethane, dibromodifluoromethane, dichlorodifluoromethane, dichlorotetrafluoroethane, methylene chloride and so on. These foaming agents may be used alone or in a combination of two or more. The amount of the foaming agent used is properly selected depending on the specific gravity, expansion ratio and so on of the target foam.

The sponge member 4 having a specific gravity of higher than 0.06 but not higher than 0.25 and/or an air permeability of not higher than 5 cc/cm$^2$/sec can be produced, for example, (1) by controlling a balance of a resinification reaction and a gasification reaction in a formation of the resin foam. The sponge member 4 has a higher specific gravity as compared with a common foam, and therefore it is preferable to suppress the gasification reaction as compared with a formation of the common foam. According to this method, the polyurethane foam suitable for the sponge member 4 can be produced by selecting the polyurethane as the resin.

Also, the sponge member 4 having a specific gravity of higher than 0.06 but not higher than 0.25 and/or an air permeability of not higher than 5 cc/cm$^2$/sec can be produced, for example, (2) by thermally compressing the foam to shape it and thereby make it be a thermally compression-molded body. When the foam is thermally compressed to form the thermally compression-molded body, conditions for the thermal compression such as heating temperature, compression time, compression force, compressibility ratio and so on are not particularly limited. Further, as the machine used in the thermal compression molding are mentioned a compression roll, a conveyer, a heat press machine, a mold and so on.

When the polyurethane foam is thermally compressed to form the thermally compression-molded body, it is preferable to add polymers of ethylenic unsaturated monomers such as polyacrylonitrile, polyvinyl chloride, polystyrene, polyethylene, polyvinylidene chloride, polypropylene, polyvinyl acetate and the like to the polyurethane raw material. The thermal compression formability of the polyurethane foam can be improved by adding the polymer of the ethylenic unsaturated monomers.

The shape of the sponge member is not particularly limited, and for example, includes a rectangle, a trapezoid, a sine wave and so on as its cross-sectional shape.

The tire-rim assembly according to the invention can be produced, for example, by fixing the sponge member 4 on the inner surface of the pneumatic tire 1 and/or the tire internal cavity 3 side surface of the rim 2 with using an adhesive agent or a tackiness agent such as a synthetic rubber-based adhesive, an acrylic adhesive and the like, and then assembling the pneumatic tire 1 onto the rim 2. Moreover, as a gas filled into the tire internal cavity 3 of the tire-rim assembly according to the invention can be used usual air or air having a regulated partial oxygen pressure but also inert gases such as nitrogen and so on.

EXAMPLES

The following examples are given in illustration of the invention and are not intended as limitations thereof.

<Sponge Member>

A sponge member A composed of an ether-based polyurethane foam (specific gravity=0.014, air permeability: 90 cc/cm$^2$/sec), a sponge member B composed of an ether-based polyurethane foam (specific gravity=0.045, air permeability: 100 cc/cm$^2$/sec), a sponge member C composed of an ether-based polyurethane foam (specific gravity=0.07, air permeability: 3-5 cc/cm$^2$/sec) and a sponge member D composed of an EPDM foam (specific gravity=0.065, air permeability: 0.1-5 cc/cm$^2$/sec) are provided as the test sponge member.

<Measurement of Sound Absorption Coefficient>

With respect to the sponge member (one having a thickness of 20 mm), the sound absorption coefficient is measured according to Acoustics Determination of sound absorption coefficient and impedance in impedance tubes Part 2: Transfer-function method in ISO 10534-2: 1998. Results are shown in Tables 1 and 2. The larger the value is, the better it is.

TABLE 1

| | One having a thickness of 20 mm | | | |
|---|---|---|---|---|
| | Comparative Example 1 Sponge member A | Comparative Example 2 Sponge member B | Example 1 Sponge member C | Example 2 Sponge member D |
| Specific gravity | 0.014 | 0.045 | 0.07 | 0.065 |
| Air permeability (cc/cm²/sec) | 90 | 100 | 3-5 | 0.1-5 |
| 50 Hz | 0.039 | 0.023 | 0.031 | 0.051 |
| 100 Hz | 0.036 | 0.018 | 0.037 | 0.047 |
| 180 Hz | 0.059 | 0.056 | 0.100 | 0.088 |
| 200 Hz | 0.061 | 0.063 | 0.115 | 0.099 |
| 275 Hz | 0.073 | 0.098 | 0.191 | 0.139 |
| 300 Hz | 0.076 | 0.110 | 0.225 | 0.159 |
| 400 Hz | 0.092 | 0.161 | 0.353 | 0.284 |

As seen from Table 1, the sponge member having a specific gravity of higher than 0.06 but not higher than 0.25 has a high sound absorption coefficient especially at 180 Hz or higher as compared with the sponge member having a specific gravity of not higher than 0.06. Also, it turns out that the sound absorption coefficient of the sponge member having an air permeability of not higher than 5 cc/cm²/sec is similarly high.

<Sponge Member>

Then, the sponge member A composed of the ether-based polyurethane foam (specific gravity=0.014, air permeability: 90 cc/cm²/sec), the sponge member B composed of the ether-based polyurethane foam (specific gravity=0.045, air permeability: 100 cc/cm²/sec), the sponge member C composed of the ether-based polyurethane foam (specific gravity=0.07, air permeability: 3-5 cc/cm²/sec) and the sponge member D composed of the EPDM foam (specific gravity=0.065, air permeability: 0.1-5 cc/cm²/sec) are provided as the test sponge member.

<Preparation of Tire-Rim Assembly>

A tire-rim assembly having a structure shown in FIG. 1 are prepared by using the above-described sponge member. The tire has a size of 245/45, the rim has a size of 19 inches, the cross-sectional shape of the sponge member has a height of 20 mm and a width of 100 mm, and the sponge member continuously extends in a circumferential direction. Further, a tire-rim assembly not using a sponge member (Comparative Example 3) is prepared for a comparison. In this context, the sponge member A (specific gravity=0.014, air permeability: 90 cc/cm²/sec) is used in the tire-rim assembly of Comparative Example 4, the sponge member B (specific gravity=0.045, air permeability: 100 cc/cm²/sec) is used in the tire-rim assembly of Comparative Example 5, the sponge member C (specific gravity=0.07, air permeability: 3-5 cc/cm²/sec) is used in the tire-rim assembly of Example 3, and the sponge member D (specific gravity=0.065, air permeability: 0.1-5 cc/cm²/sec) is used in the tire-rim assembly of Example 4.

<Evaluation of Road Noise>

The tire-rim assembly as prepared above is mounted onto a vehicle and run on an asphalt road at a speed of 40 km/h, 50 km/h, 60 km/h and 70 km/h, during which sound in the vehicle is measured and a sound pressure level of a peak value of a cavity resonance near 200 Hz is measured to evaluate the road noise. Results are shown in FIG. 2.

Figure 2:
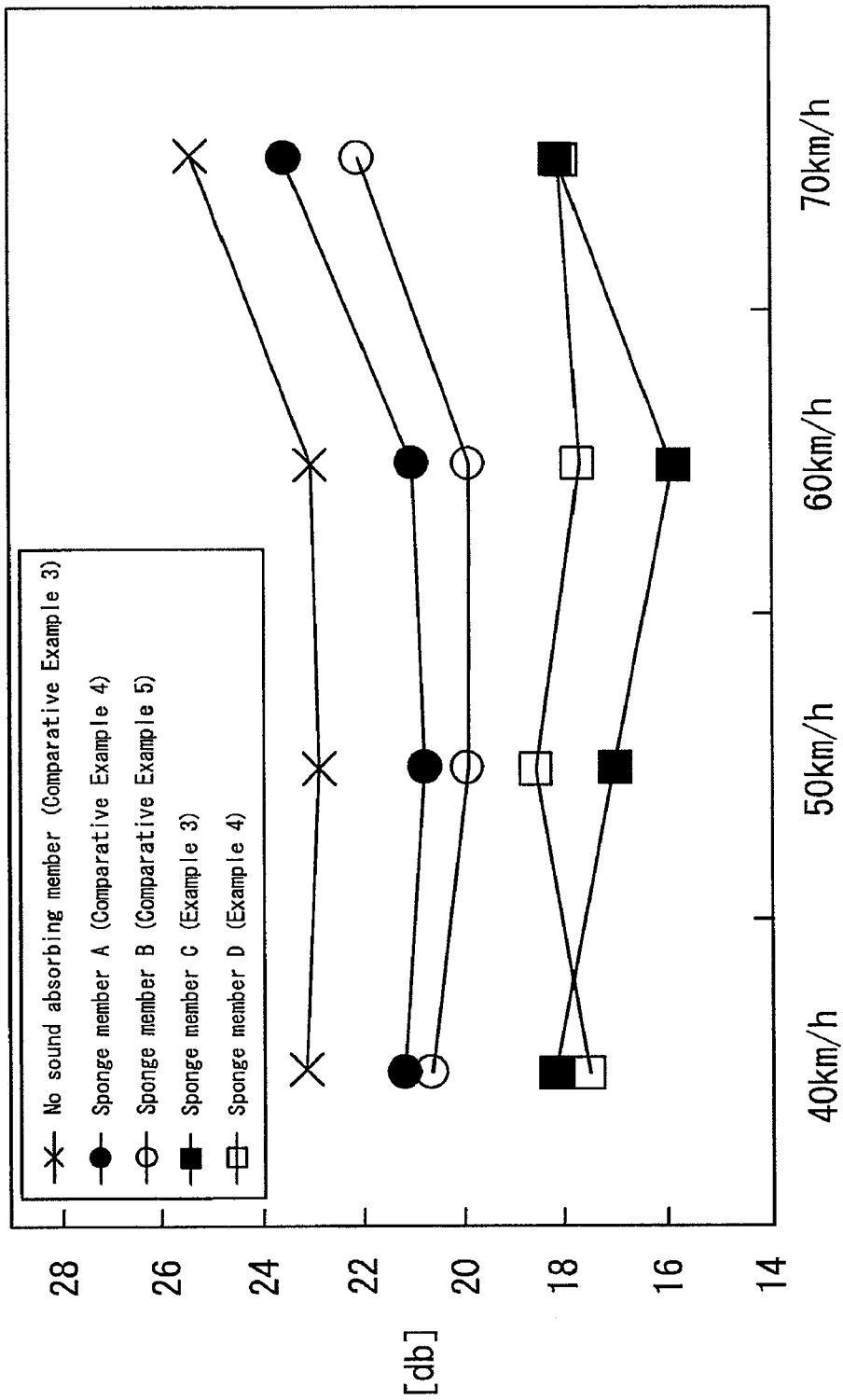
FIG. 2 is a graph showing results of the road noise evaluation of the assemblies in the Comparative Examples and the Examples.

As seen from FIG. 2, the road noise especially near 200 Hz during the high-speed running can be notably reduced by disposing the sponge member having a specific gravity of higher than 0.06 but not higher than 0.25. Further, it turns out that the road noise of the assembly using the sponge member having an air permeability of not higher than 5 cc/cm²/sec can be also reduced notably.

The invention claimed is:

1. A tire-rim assembly comprising a pneumatic tire, a rim and a sponge member disposed in a tire internal cavity defined by the pneumatic tire and the rim, characterized in that:
   the sponge member has a specific gravity of higher than 0.06 but not higher than 0.25, and an air permeability of not higher than 5 cc/cm²/sec;
   the sponge member is fixed on an inner surface of the pneumatic tire and/or a tire internal cavity side surface of the rim; and
   the sponge member has a continuous cell.

2. A tire-rim assembly according to claim 1, characterized in that the sponge member is a molded body using a synthetic resin foam.

3. A tire-rim assembly according to claim 2, characterized in that the sponge member is a thermally compression-molded body formed by thermally compressing the synthetic resin foam.

4. A tire-rim assembly according to claim 1, characterized in that the sponge member is an ether-based polyurethane foam.

5. A tire-rim assembly according to claim 1, characterized in that the sponge member is a synthetic rubber foam.

6. A tire-rim assembly according to claim 1, characterized in that the sponge member does not contain a water repellent agent.

7. A tire-rim assembly according to claim 1, characterized in that the sponge member is disposed on at least a part of an inner surface of a tread portion of the pneumatic tire.

8. A tire-rim assembly according to claim 1, characterized in that the sponge member is disposed on the rim.

9. A tire-rim assembly according to claim 1, characterized in that a cross-sectional shape of the sponge member is rectangular.

10. A tire-rim assembly according to claim 1, characterized in that a cross-sectional area of the sponge member is constant at each location in a circumferential direction of the pneumatic tire.

* * * * *